United States Patent
Bodell et al.

(10) Patent No.: US 9,773,257 B1
(45) Date of Patent: Sep. 26, 2017

(54) OPTING WHETHER TO RECEIVE COMMUNICATIONS

(75) Inventors: Colin Bodell, Seattle, WA (US); Christopher A. Wheeler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 872 days.

(21) Appl. No.: 12/971,291

(22) Filed: Dec. 17, 2010

(51) Int. Cl.
*G06Q 30/00* (2012.01)
*G06Q 30/02* (2012.01)

(52) U.S. Cl.
CPC .............................. *G06Q 30/0251* (2013.01)

(58) Field of Classification Search
USPC .......................................................... 705/14
See application file for complete search history.

(56) References Cited

U.S. PATENT DOCUMENTS

| | | | |
|---|---|---|---|
| 2003/0172374 A1* | 9/2003 | Vinson et al. | 725/9 |
| 2005/0119935 A1* | 6/2005 | Boss et al. | 705/14 |
| 2009/0063261 A1* | 3/2009 | Scribner et al. | 705/14 |
| 2010/0109901 A1* | 5/2010 | Martin-Cocher | G06Q 30/0251 379/45 |
| 2011/0246277 A1* | 10/2011 | Neldurg | G06Q 30/02 705/14.25 |
| 2013/0086608 A1* | 4/2013 | Slaney et al. | 725/34 |

OTHER PUBLICATIONS

Authorize.net http://www.authorize.net/company/spampolicy Vogel Promotions http://www.voglepromotions.com/privacystatement.htm Email-Sender Rejection Settings http://www.esoft.com/support/knowledge-base/email-sender-rejection-settings.*
http://www.stopthejunkmail.com, Jul. 8, 2007.*

* cited by examiner

*Primary Examiner* — David Stoltenberg
*Assistant Examiner* — Allan Woodworth, II
(74) *Attorney, Agent, or Firm* — Thomas Horstemeyer, LLP

(57) ABSTRACT

Disclosed are various embodiments for facilitating opting back in to, or controlling, the sending of promotional communications by customers. A system is provided that includes at least one computing device upon which an application is executable. The application is configured to determine an option status of a customer with respect to whether the customer wishes to receive a plurality of promotional communications from a merchant. The application is further configured to determine whether an opted-out customer meets a criterion to be prompted to opt back into receiving the promotional communications. Also, the application is configured to associate a prompt with a network content item to send to a client. The prompt is configured to initiate a re-selection of the option status of the customer if manipulated by the customer at the client.

23 Claims, 8 Drawing Sheets

Email Opt-in

Previously you had opted out of receiving our email offers. Perhaps you might want to reconsider given that we can make you aware of some exciting offers. Please select the desired terms by which you would like to receive future emails below.

243

☐ Receive all future emails about discounts and other offers

246

Frequency and Timing Limitations

☐ Send promotional emails as specified below:

☐ [3 ▽] emails every [Week ▽]

☐ Send a [Weekly Digest ▽] of offers and deals

☐ Send [3 ▽] sample emails so I can see if I want more

249

☐ Do not send emails for at least [2 Months ▽]

Category Limitations

☐ I only want to receive future emails about offers and other information relating to the following product categories:

☐ Electronics

☐ Home & Garden

☐ Movies, Games, and other Media

☐ Toys

☐ Clothing, Shoes, and Jewelry o
o
o

OPTING WHETHER TO RECEIVE COMMUNICATIONS

BACKGROUND

Some online merchants send promotional emails and the like to their customers to inform them of special offers and deals for merchandise. Some customers choose to opt out of such special offers and deals at certain times due to the fact that such promotional emails may not be deemed very relevant to the customer given the circumstances at the time. However, it may be the case that the customer may want to receive future promotional emails for other items when circumstances change. The problem is that when a customer unsubscribes to promotional or other emails, they eliminate the possibility of receiving future emails with promotions in which the user may very well wish to participate.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3, 4, and 5 are drawings of various examples of network content rendered by a client in the networked environment of FIG. 1 according to various embodiments of the present disclosure.

DETAILED DESCRIPTION

This disclosure relates to providing for the ability of a user to opt back in to promotional communications such as emails from a merchant after the user has unsubscribed or opted out of such communications. The user may have opted out of all such communications, or a portion of such communications, where the portion may comprise communications that fall into various designated categories. In addition, this disclosure further relates to controlling a promotional communication policy based on feedback received from a user as will be described. In the following discussion, a general description of the system and its components is provided, followed by a discussion of the operation of the same.

Figure 1:
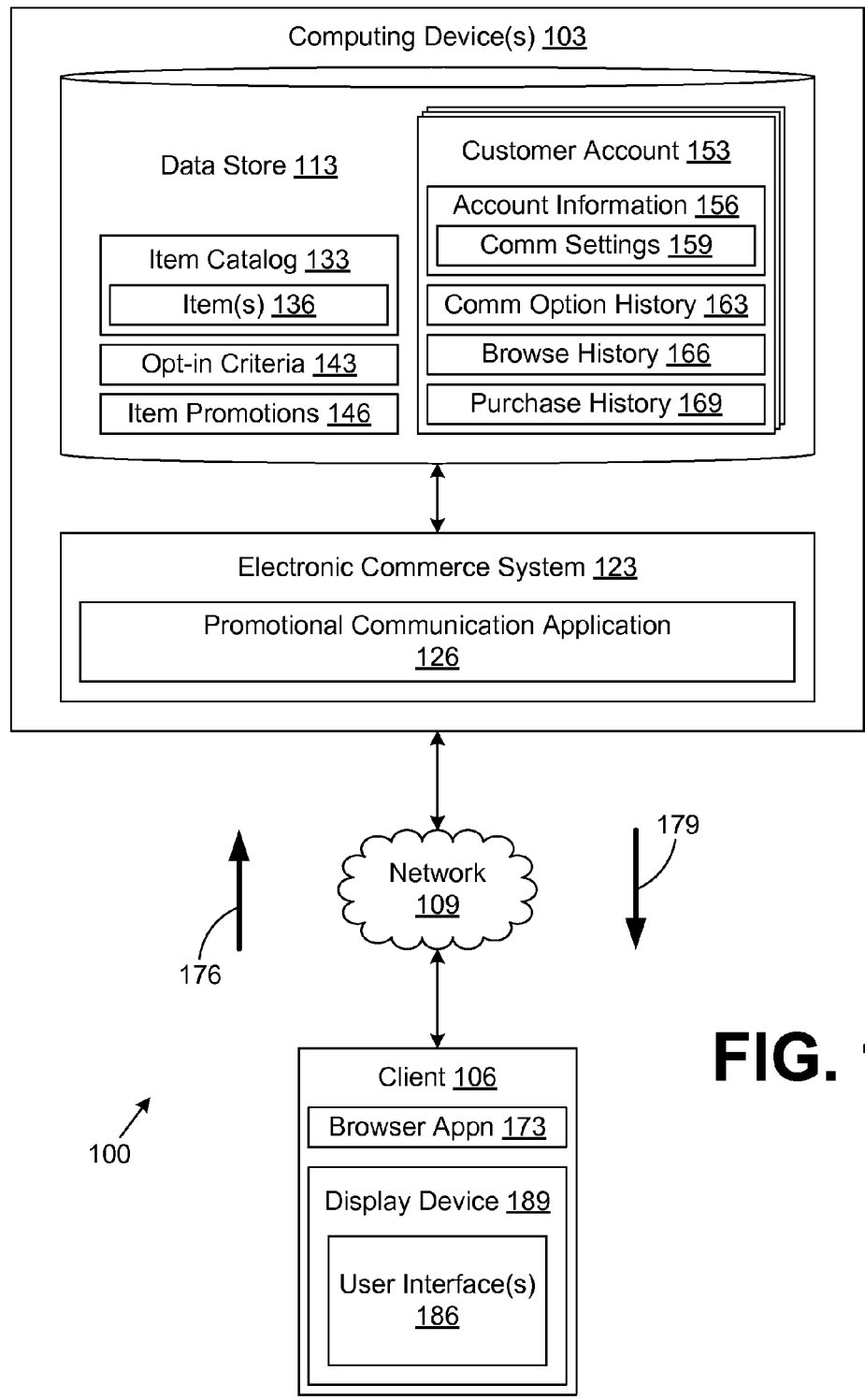
FIG. 1 is a drawing of a networked environment according to various embodiments of the present disclosure.

With reference to FIG. 1, shown is a networked environment 100 according to various embodiments. The networked environment 100 includes one or more computing devices 103, clients 106, and potentially other devices, each of which is coupled to a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores 113 as can be appreciated. The data stored in the data store 113, for example, is associated with the operation of the various applications and/or functional entities described below.

The components executed on the computing device 103, for example, include an electronic commerce system 123 and other applications, services, processes, systems, engines, or functionality not discussed in detail herein. A promotional communication application 126 is executed as a portion of the electronic commerce system 123 as will be described.

The electronic commerce system 123 is executed in order to facilitate the online purchase of items 136 over the network 109. The electronic commerce system 123 also performs various backend functions associated with the online presence of a merchant in order to facilitate the online purchase of items 136 as will be described. For example, the electronic commerce system 123 generates network content such as web pages, pop-ups, or other types of network content that are provided to clients 106 for the purposes of selecting items for purchase, rental, download, lease, or other form of consumption as will be described.

The promotional communication application 126 is implemented in order to provide an opportunity to customers who have unsubscribed to all or a portion of the promotional communications from a merchant such as emails, SMS messages, telephone calls, and other types of messages to opt back in to receiving such communications. The promotional communication application 126 further provides such customers with the ability to opt back in to receiving promotional communications and to exert control over how such communications are sent. In other embodiments, the promotional communication application 126 exerts control over a communications policy with respect to a customer in response to feedback received from a customer relating to prior received promotional communications. The functionality of the promotional communication application 126 will be described in greater detail below.

The data stored in the data store 113 includes, for example, an item catalog 133 that includes a listing of items 136. In the listing of items 136, the item catalog 133 includes various information that describes each of the items 136 including item descriptions, prices, delivery options, and other information. The data stored in the data store 113 also includes opt-in criteria 143 by which customers who previously unsubscribed to promotional communications may be measured to determine whether an invitation to opt back in to receiving such promotional communications should be presented to such customers as will be described.

The data further includes item promotions 146 that are directed to various items 136. The item promotions 146 may comprise, for example, sales, special deals, giveaways, and other types of promotions that provide incentive to customers to purchase items through the electronic commerce system 123. The item promotions 146 may include those that are currently offered as well as those that are scheduled to be offered at some time in the future. Each item promotion 146 is associated with one or more of the items 136 maintained in the item catalog 133.

In addition, stored in the data store 113 are customer accounts 153 that include information about customers who purchase items 136 through the electronic commerce system 123. Each customer account 153 includes account information 156 about a respective customer. Such account information 156 may comprise, for example, a customer name, shipping addresses, billing addresses, payment instrument information, and other information necessary to conduct electronic commerce with the customer through the electronic commerce system 123.

In addition, the account information 156 further includes communication settings 159 that are employed to determine how various promotional communications may be sent to a respective customer. In one embodiment, the communication settings 159 set forth a promotional delivery policy or schedule that is consulted to determine when promotional communications such as emails, SMS messages, or other types of messages are sent to a customer to alert them to special offers and other promotions offered by a merchant through the electronic commerce system 123.

In addition, associated with each customer account 153 is a communication option history 163 that includes information generated by a customer that indicates their wishes over time with respect to the receipt of promotional communications sent by a merchant through the promotional communication application 126. To this end, the communication option history 163 may record instances where customers have expressed a desire not to receive certain communications and other information as can be appreciated.

Each customer account 153 may further include a browse history 166 and a purchase history 169. The browse history 166 is a log of network content 179 such as network pages and other content items that were viewed by a user as they interacted with the electronic commerce system 123. Thus, the browse history 166 provides a record of the activity of a given user with respect to the electronic commerce system 123. The purchase history 169 provides a listing of products previously purchased by a user through the electronic commerce system 123. In addition, it may be the case that other data is stored in the data store 113 as can be appreciated.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, electronic book readers, or other devices with like capability.

The client 106 may be configured to execute various applications such as a browser application 173 and/or other applications. The browser application 173 may be executed in a client 106, for example, to access and render network content served up by the computing device 103 and/or other servers. The client 106 may be configured to execute applications beyond browser application 173 such as, for example, email applications, instant message applications, and/or other applications.

In one embodiment, a user may employ the browser application 173 to generate requests 176 for network content 179 such as web pages, pop-ups, or other network content 179 from the computing device 103. In this embodiment, the browser application 173 renders such network content 179 as user interfaces 186 on a display device 189 of the client 106. The display device 189 may comprise, for example, a liquid crystal display (LCD), plasma screen, a cathode ray tube (CRT), or other type of display as can be appreciated.

It should be noted that the browser application 173 is representative of the various different applications that may be implemented on the client 106 in order to render network content 179. Other applications may comprise, for example, electronic book reader applications or other applications.

Next, a general description of the operation of the various components of the networked environment 100 is provided. In some cases, customers who purchase items 136 through the electronic commerce system 123 may unsubscribe or otherwise opt out of receiving promotional communications from the merchants operating the electronic commerce system 123. For example, a customer may select an "unsubscribe" or other opt-out component in a communication such as an email from the merchant. Alternatively, a user may access their communications settings 159 to manually indicate that they do not wish to receive such promotional communications. Still further, in a promotional communication comprising a telephone call, a customer might press a sequence of numbers in a menu to indicate their desire to opt out of future calls.

As another alternative, a user may place communications in a "spam" folder or other such designated location upon receipt as is the case with many electronic mail systems. In many cases, if a user indicates that a given communication such as an electronic mail is spam or other negative designation, a message is automatically sent back to their Internet Service Provider (ISP) registering a complaint indicating that the communication was unwanted. In such case, the ISP may send a message back to the merchant that originated the communication indicating that the customer has complained about receiving the communication from the merchant. In some situations, the customer may automatically be unsubscribed upon receipt of such a complaint.

However, when a user completely unsubscribes to promotional communications from a merchant, such an action may be overly broad due to the fact that, although a customer may have expressed a desire not receive certain promotional communications, there may be other future promotional communications that they may wish to receive. For example, problems that customers may have with respect to certain promotional communications may be localized to specific types of content presented in such promotional communications, whereas other content might be desirable.

According to various embodiments, approaches are employed to facilitate a customer opting back into receiving communications. Also, various systems are provided that facilitate providing control to a customer over a promotional communication transmission policy.

In one embodiment, the promotional communication application 126 is configured to determine an option status of a customer, where the option status indicates whether the customer wishes to receive promotional communications from a merchant. Such a determination may be made when the user is interacting with the electronic commerce system 123 viewing various network content 179 on the client 106 as described above. Alternatively, such a determination may be made when a customer is on a telephone call on hold, for example, waiting to talk to support personnel associated with the merchant. The promotional communication application 126 is further configured to determine whether a customer that has opted out of receiving such promotional communications meets predefined criteria specified in the opt-in criteria 143 to be prompted to opt back in to receiving the promotional communications.

Assuming, for example, that a given customer who requests network content 179 from the electronic commerce system 123 meets the applicable opt-in criteria 143, the promotional communication application 126 is configured to associate a prompt with the network content 179 that is to be sent to the client 106 in response to the request 176. The prompt is configured to initiate a reselection of the option status of the customer upon manipulation by the customer at the client 106. According to one embodiment, the network content 179 requested may comprise a network page such as a web page or other like content. The prompt may be embedded within the network page, may be embedded within a pop-up associated with the network page, or may be included in the network content in some other manner. Alternatively, the prompt may comprise a message played during the course of a telephone call directing a user to indicate their wish to opt back into promotional communications by pressing one or more numbers on a push button telephone, etc.

In the case that the prompt is embodied in network content 179, the prompt may include an appropriate graphical component that is rendered on the display device 189 as a portion of a network content 179 requested, where the graphical component is configured to initiate the reselection of the option status of the customer. In one embodiment, the graphical component may comprise a hyperlink, although the graphical component may comprise, for example, buttons, check boxes, links, or other components as can be appreciated.

Assuming that the user has manipulated the respective graphical component associated with the prompt that is presented to the customer on the client 106, then the reselection of the option status may be facilitated by generating further network content 179 such as, for example, a network page, etc., to facilitate a selection of one or more options to control the delivery of future promotional communications to the customer. In the case that the user has indicated a willingness to receive promotional communications over the telephone by pressing appropriate numbers according to a predefined menu, then such options may automatically be presented in subsequent network content 179 viewed by the customer at a later time or concurrently with the telephone call.

According to various embodiments, the options may include the selection of frequency at which the promotional communications are generated and sent to the customer, a selection causing one or more sample promotion communications to be sent to the customer, an option that facilitates imposing a moratorium for a predefined period of time over sending the promotional communications to the customer, or an option that facilitates selections of one or more categories of items, where the promotional communications are restricted to subject matter related to the selected categories of items 136.

In one embodiment, the prompt is presented in association with an item depicted in the network page or other network content 179 requested by the customer. That is to say that the prompt may relate to an item 136 already presented in the network content 179. For example, the network content 179 may comprise a network page that presents search results from a search performed through the items 136 in the item catalog 133. Such a network page may be termed a "search results network page." Alternatively, other network pages may be generated by the electronic commerce system 123 that present various items 136 including, for example, home pages, product landing pages, and other types of network pages as can be appreciated. In one embodiment, the prompt may relate to a category that includes an item 136 depicted in the respective network page to be generated.

In addition, in situations where the merchant receives complaints indicating rejections by customers of various promotional communications such as promotional emails as described above, the promotional communications application 126 may be configured to store each instance of a rejection of a given communication in the communication option history 163. In one embodiment, each of the instances of rejection of a communication indicates that the promotional communication was unwanted by the recipient.

According to one embodiment, the promotional communication application 126 examines the communication option history 163 to identify patterns of rejection instances. For example, a given pattern may specify that a certain number of rejections are received within a predefined period of time. Alternatively, other patterns may be specified.

Assuming that a predefined pattern of rejection instances was detected in the communication option history 163, then a change may be implemented in a transmission policy for sending the promotional communications to the respective customer in response. According to one embodiment, such a change in the transmission policy may involve changing the frequency by which such promotional communications are generated and sent to the customer. Further, such a change in the transmission policy may involve restricting the content of respective promotional communications to one or more categories of items 136 specified by the customer or determined from the browse history 166 and/or purchase history 169 of the customer.

Alternatively, the transmission policy may be changed by completely unsubscribing the customer from receiving the promotional communications. In addition, the transmission policy may be changed by imposing a moratorium on sending the promotional communications to the customer for a predefined period of time. In addition, some sort of graphical representation may be included within network content 179 such as a web page or other content that is sent to the recipient confirming that a change in a transmission policy was implemented. Such a confirmation may be sent to the customer in some other manner, such as, via an email, SMS message, or other type of message. In addition, the transmission policy may be changed in some other manner as can be appreciated.

By making such changes, the customer may still be willing to receive promotional communications from the merchant, albeit either at a reduced frequency or restricted in some other manner. Consequently, the merchant can still inform the customer of special offers and other information that the customer may truly wish to see, without sending unwanted promotional communications.

Figure 2:
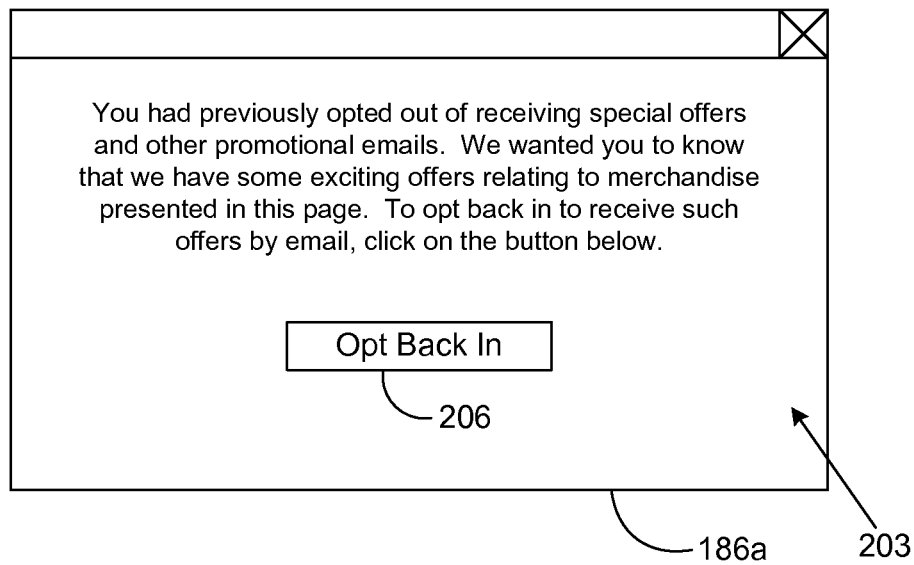
FIG. 2 is a drawing of an example of a pop-up rendered by a client in the networked environment of FIG. 1 according to various embodiments of the present disclosure.

Referring next to FIG. 2, shown is one example of a user interface 186, denoted herein as user interface 186a, according to various embodiments. The user interface 186a includes a prompt 203 that is to be presented to a customer who is currently not receiving promotional emails in order to enable them to opt back in to receiving such promotional emails if desired. The prompt 203 includes a graphical component 206 comprising, for example, a push button. Alternatively, the graphical component 206 may comprise some other component as can be appreciated.

According to one embodiment, if a user wishes to opt back in to receiving promotional communications, the user may manipulate the graphical component 206 in order to cause the browser application 173 (FIG. 1) to send a request for further network content 179 (FIG. 1) that facilitates a reselection of the option status of the customer with respect to receiving such promotional communications. The user interface 186a is embodied in a form of a pop-up that may be associated with a given network page or other network content 179 downloaded from the computing device 103 (FIG. 1) to the client 106 (FIG. 1) as can be appreciated.

Figure 3:

With reference to FIG. 3, shown is another example of user interface 186, denoted herein as user interface 186b, according to various embodiments. The user interface 186b comprises the rendering of network content 179 (FIG. 1) in the form of a network page or web page by the browser application 173 (FIG. 1) on the client 106 (FIG. 1). The network page depicted comprises, for example, a search results network page that presents the results of a search performed in the item catalog 133 (FIG. 1) for items 136 responsive to a search query supplied by the customer. Embedded within such a network page is a prompt 223 that encourages a customer to opt back in to receiving various promotional emails after having opted out of the same. The prompt 223 specifically notes that various offers are available that relate to specific items 136 presented within the network page itself. Also, the prompt 223 includes a graphical component 226 comprising, for example, a hyperlink that may be manipulated by the customer to start the process of opting back in to receiving such promotional communications.

Figure 4:

With reference next to FIG. 4, shown is another example of a user interface 186, denoted herein as user interface 186c, according to various embodiments. The user interface 186c presents several items 136 such as will be the case, for example, in a search results network page as mentioned above.

The user interface 186c includes a prompt 233 that encourages customers to opt back in to receiving promotional communications where such customers were previously unsubscribed due to the fact that the merchant received complaints from the customers through their ISP that they considered prior received promotional communications to be spam or otherwise unwanted.

According to one embodiment, the prompt 233 indicates that promotions are available that relate to items 136 presented in the network page depicted in the user interface 186c, although it is possible that the prompt 233 may not indicate such promotions exist. In addition, a graphical component 236 is included as part of the prompt 233 that a customer may manipulate to start the process of opting back in to receiving promotional communications as can be appreciated.

Referring next to FIG. 5, shown is an example of a user interface 186, denoted herein as user interface 186d, according to an embodiment of the present disclosure. According to the example shown, the user interface 186d is embodied in the form of a network page that is served up to the client 106 (FIG. 1) as the network content 179 (FIG. 1). In one embodiment, the network content 179 embodying the user interface 186d is generated in response to an HTTP request generated by the browser application 173 (FIG. 1) when a customer manipulates one of the graphical components 206 (FIG. 2), 226 (FIG. 3), or 236 (FIG. 4). The user interface 186d allows a customer to specify the conditions under which he/she will receive future promotional communications from the merchant.

The user interface 186d includes a re-subscribe option 243 that may be selected by a customer that specify that all promotional communications may be sent to the user without restriction. Effectively, this allows the customer to re-subscribe after unsubscribing from such promotional communications.

The user interface 186d also includes frequency/timing options 246 that facilitate the specification of the frequency or timing by which promotional communications may be sent to the customer. The frequency/timing options 246 allow a customer to specify, for example, that a predefined number of promotional communications are to be sent during each predefined time period (e.g. a day, week, month, etc.). One may specify that a periodic communication is to be sent for a weekly, monthly, or other periodic digest of offers and information. Further, a customer may specify that one or more sample promotional communications be sent so that the customer may evaluate whether they wish to continue receiving such communications.

In addition, the user interface 186d includes category options 249. The category options 249 specify a number of item categories 253. When an item category 253 is selected, then the content of the promotional communications sent to the customer are restricted to those item categories 253 selected. For example, the only promotions or offers set forth in the promotional communications will be directed to items 136 in one of the selected categories 253. In addition, there may be other ways beyond those described herein that a user may specify the conditions under which he/she will receive future promotional communications from the merchant. In addition, various graphical selection components such as check boxes, toggles, picklists, or other components may be employed to facilitate the selection of the various options 243, 246, or 249. In some examples, two or more options 243, 246, 249 may be selected and applied together. For example, one may specify that promotional communications are to be sent at a predefined frequency and must relate to specific item categories 253.

Figure 6:
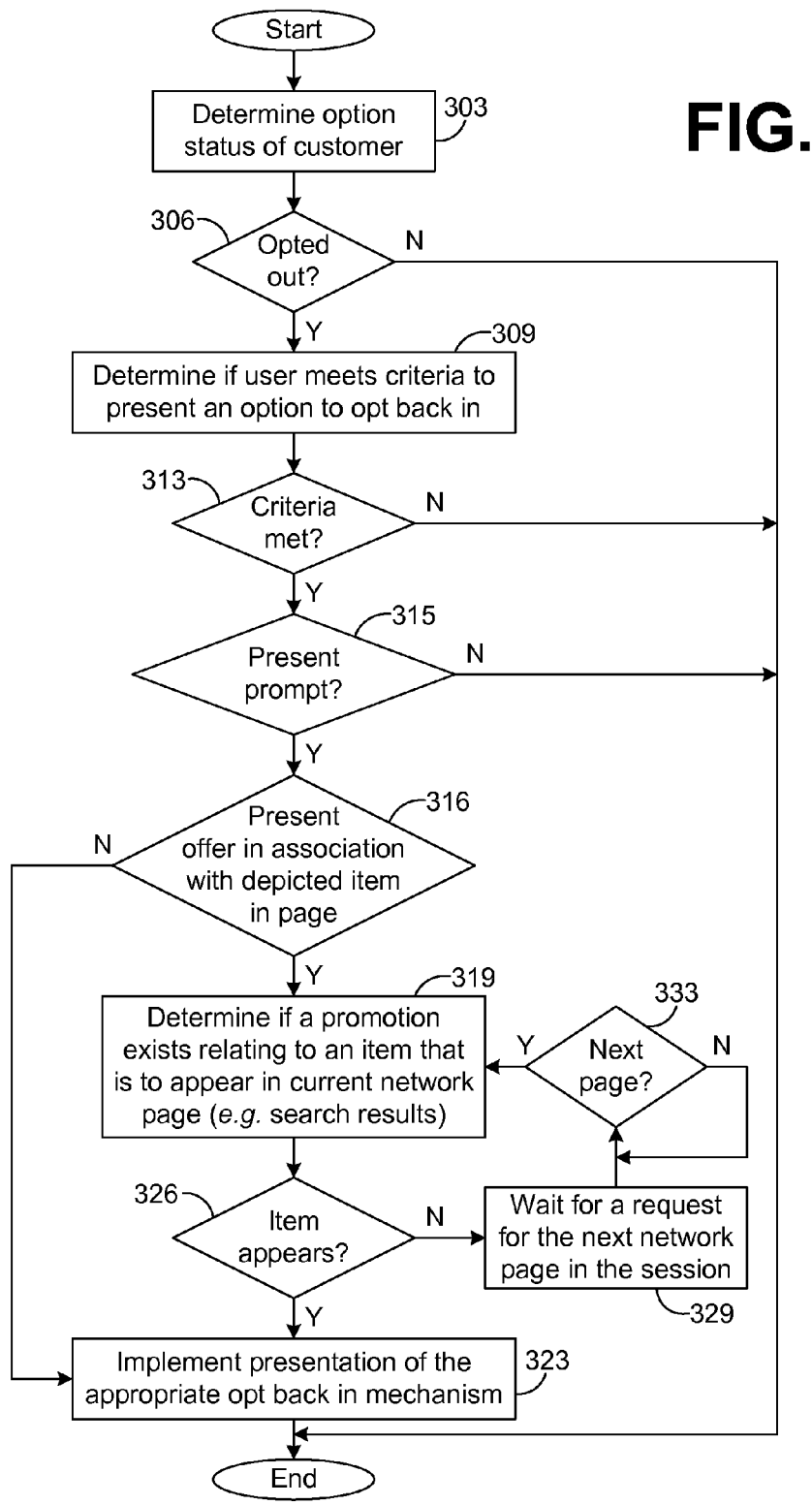
FIG. 6 is a flowchart illustrating one example of functionality implemented at least as a portion of a promotional communication application executed in a computing device in the networked environment of FIG. 1 according to various embodiments of the present disclosure.

Referring next to FIG. 6, shown is a flowchart that provides one example of the operation of a portion of the promotional communication application 126 according to various embodiments. It is understood that the flowchart of FIG. 6 provides merely an example of the many different types of functional arrangements that may be employed to implement the operation of the portion of the promotional communication application 126 as described herein. As an alternative, the flowchart of FIG. 6 may be viewed as depicting an example of steps of a method implemented in the computing device 103 (FIG. 1) according to one or more embodiments.

Beginning with box 303, the promotional communication application 126 determines the options status of the respective customer interacting with the electronic commerce system 123 (FIG. 1). To this end, the user may have downloaded network content 179 (FIG. 1) in the form of the first network page rendered on the display device 189 (FIG. 1). The option status may be determined, for example, by looking up a cookie on the client 106 (FIG. 1). To this end, logic may be included within the network content 179 (FIG. 1) first sent to the client 106 for a given session to identify the option status from a cookie.

Alternatively, if the customer has authenticated themselves to the electronic commerce system 123 or a telecommunications system, then the status of a given individual may be looked up in their communications settings 159 (FIG. 1), communication option history 163 (FIG. 1), or other location where such information is maintained. Once the option status of a given customer is known, then in box 306, if the customer has not opted out of receiving any promotional communications from the merchant operating the electronic commerce system 123, then the promotional communication application 126 ends as shown. Otherwise, the promotional communication application 126 proceeds to box 309.

In box 309, the promotional communication application 126 determines if the user meets the applicable opt-in criteria 143 (FIG. 1) to receive a prompt or invitation to opt back in to the promotional communications. The opt-in criteria 143 may be specified and stored in the data store 113 as described above. One example of such opt-in criteria 143 may comprise, for example, whether a customer has purchased a predefined number of items 136 (FIG. 1) on the electronic commerce system 123 within a given past period of time. For example, it may be required that a customer has purchased at least one item 136 within the last month, week, year, or other time period as can be appreciated. In box 313, the promotional communication application 126 determines whether the applicable opt-in criterion 143 has been met. If not, then the promotional communication application 126 ends as shown, where the customer is not to receive a prompt to opt back in to receiving promotional communications. Otherwise, the promotional communication application 126 proceeds to box 315.

In box 315, the promotional communication application 126 determines whether a visual prompt 203/223, audio prompt, or other type of prompt should be presented given any previous prompts presented to the respective customer. To this end, a threshold number of viewings permitted, or a predefined frequency at which such prompts can be presented to customers may dictate whether a prompt should be presented. For example, it may be the case that once a customer has seen a prompt 203/223, it may be deemed that no further prompts 203/223 should be presented, or that a suitable period of time must elapse between the presentation of two consecutive prompts 203/223 or other type of prompt. Alternatively, other schedules for presenting such prompts may be employed that were generated based on market considerations or other considerations. Assuming that it is determined that no prompt is to be presented in box 315, then the promotional communications application 126 ends as shown. Otherwise, the promotional communications application 126 progresses to box 316.

In box 316, the promotional communication application 126 determines whether it has been configured to present offers or other promotions in association with an item 136 depicted in a given network page or other network content 179 served up to the client 106. For example, the electronic commerce system 123 may be generating a search results network page in response to a request from the client 106 during a given session. Alternatively, in the case of a telephone call to a merchant support service, a customer may indicate they are calling about a specific item. If the communication settings 159 indicate that the user is to receive offers associated with items 136 depicted in a given network page, then the promotional communication application 126 proceeds to box 319. Otherwise, the promotional communication application 126 progresses to box 323.

In box 323, the presentation of an appropriate prompt for a user to opt back in to the promotional communications is included in the network content 179 as described above. To this end, such prompt may be presented as part of a network page, a pop-up, or in some other manner as can be appreciated. Alternatively, an audio prompt may be provided to a customer who communicates with the merchant via telephone as mentioned above. Thereafter, the promotional communication application 126 ends.

Assuming that the promotional communication application 126 progresses to box 319, then it is determined whether a promotion exists relating to an item 136 that is to appear in the current network content 179 being served up to the client 106 in response to a request from the client 106, or that relates to the subject matter of a telephone call. Thereafter, the promotional communication application 126 determines in box 326 whether there are any items 136 that are to be presented that have a related promotion. If so, then the promotional communication application 126 progresses to box 323 to implement the inclusion of a given prompt 203 (FIG. 2), 223 (FIG. 3), 233 (FIG. 4) as described above, or to cause an audio prompt to be presented to a customer over the telephone. Thereafter, the promotional communication application 126 ends.

If there is no promotion for a respective item as determined in box 326, then the promotional communication application 126 progresses to box 329 to wait for the client 106 to request further network content 179 or to indicate specific interest in items 136 in some other way. Thereafter, in box 333, it is determined whether the customer has requested the next network content 179 or otherwise expressed interest in subject matter that can be examined to determine whether promotions are directed to any items 136 depicted therein. Assuming that network content 179 is to be generated and sent to the client 106, then the promotional communication application 126 reverts back to box 319 as shown.

It is understood that the functionality of the promotional communication application 126 may be implemented at appropriate times given the conditions set in the communications settings 159 when the user makes appropriate selections in the user interface 186b (FIG. 3) as described above. That is to say, that the functionality of the promotional communication application 126 may be implemented at appropriate times depending on the frequency and timing specifications set forth above.

Figures 7, 8:
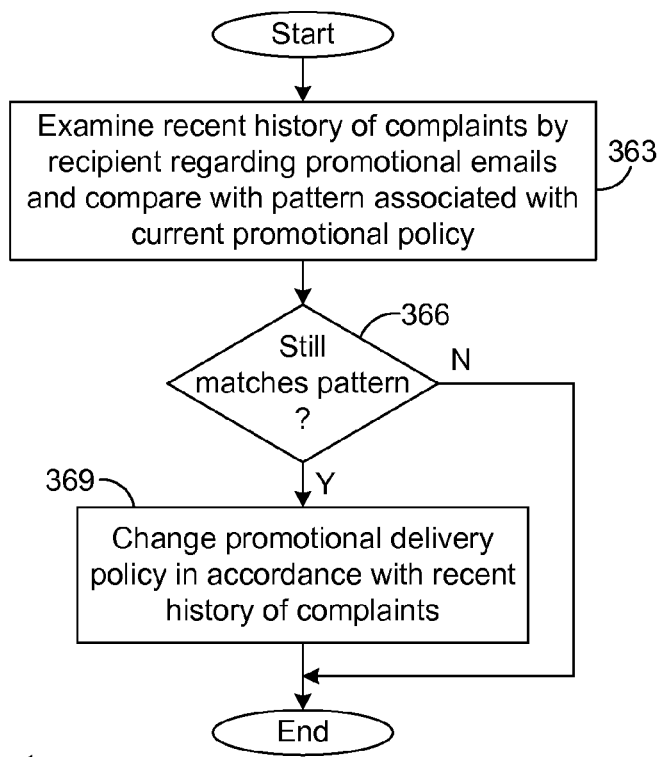
FIG. 7 is a drawing of one example of a reference table employed by a promotional communication application executed in a computing device in the networked environment of FIG. 1 according to various embodiments of the present disclosure.
FIG. 8 is a flowchart illustrating another example of functionality implemented at least as a portion of a promotional communication application executed in a computing device in the networked environment of FIG. 1 according to various embodiments of the present disclosure.

Referring next to FIG. 7, shown is a table 353 that plots a specified frequency at which promotional communications are to be sent to a customer relative to a frequency of rejections received from an ISP on behalf of the customer. The rejection frequency is expressed as ranges of rejections received with a given past time period. For example, such ranges may be 1-3, 4-6, 6-9, or greater than or equal to 10 as shown, or other ranges of individual entries may be used.

Alternatively, the frequency of communications sent per given time period may be specified as a function of the rejections received.

In the example shown, a base number of communications per given time period such as month, week, or other time period may be specified for the lowest number of rejections received as shown. Thereafter, the frequency per each time period may be increased accordingly. Thus, the table 353 may be employed to determine how frequent promotional communications are to be sent to the customer relative to the number of rejections received from a customer. Such rejections of the promotional communications may comprise, for example, a customer specifying that such promotional communications are spam or other negative designation.

Referring next to FIG. 8, shown is a flowchart that provides one example of the operation of another portion of the promotional communication application 126 according to various embodiments. It is understood that the flowchart of FIG. 8 provides merely an example of the many different types of functional arrangements that may be employed to implement the operation of the portion of the promotional communication application 126 as described herein. As an alternative, the flowchart of FIG. 8 may be viewed as depicting an example of steps of a method implemented in the computing device 103 (FIG. 1) according to one or more embodiments.

The flowchart of FIG. 8 depicts functionality of the promotional communication application 126 in adjusting a transmission policy for sending promotional communications to a customer given feedback from the customer received through their ISP.

Beginning with box 363, the promotional communication application 126 examines the history of complaints as stored in the communication option history 163 (FIG. 1) received for a given customer regarding the promotional communications. Such communication option history 163 is compared with various patterns associated with a current promotional transmission policy stored in the data store 113 (FIG. 1). For example, a pattern may comprise receiving a predefined number of complaints within a predefined period of time. One such pattern may comprise, for example, receiving three complaints within a given month or other pattern as can be appreciated.

In box 366, the promotional communication application 126 determines whether a given pattern is represented within the complaints stored in the communication option history 163. If such is the case, then the promotional communication application 126 progresses to box 369 in which the promotional communication delivery policy is changed in accordance with the recent history of complaints. According to one embodiment, a maximum passed time period may be examined at any given time to determine whether patterns exist. For example, it may be the case that only a months worth of data is examined to search for patterns. Thereafter, the promotional communication application 126 ends as shown.

According to one embodiment, the promotional communication application 126 depicted in FIG. 8 may be executed periodically as customers express complaints related to various promotional communications received through their ISP or through some other facilitator as can be appreciated.

In order to change a given promotional communication delivery policy, the promotional communication application 126 may change the frequency at which promotional communications are sent to the customer based upon the table 353 as described above. Also, the promotional communication application 126 may automatically restrict the promotional communications to offers and other information related to items 136 falling within predefined item categories as described above. Such categories may be those that are of the greatest interest to the customer based on their respective browse history 166 (FIG. 1) and/or purchase history 169 (FIG. 1) as mentioned above.

Further, the promotional communication application 126 can unsubscribe the customer or impose a temporary moratorium on the transmission of promotional communications as described above. According to one embodiment, when a user logs in or views subsequent network content 179, the current promotional communication delivery policy may be presented to the user for them to confirm as desired.

Figure 9:
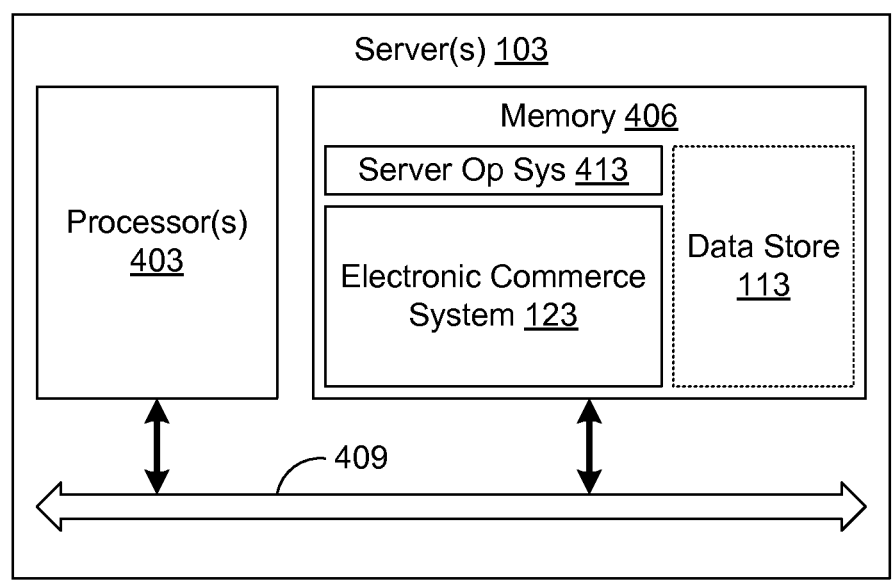
FIG. 9 is a schematic block diagram that provides one example illustration of a computing device employed in the networked environment of FIG. 1 according to various embodiments of the present disclosure.

With reference to FIG. 9, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is a server operating system 413, and applications such as the electronic commerce system 123 that includes the promotional communication application 126 (FIG. 1), and potentially other applications. Also stored in the memory 406 is the data store 113 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 123 that includes the promotional communication application 126, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6 and 8 show the functionality and operation of implementations of various portions of the promotional communication application 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 6 and 8 show a specific order of execution, it is understood that the order of execution may differ from that which is depicted. For example, the order of execution of two or more blocks may be scrambled relative to the order shown. Also, two or more blocks shown in succession in FIGS. 6 and 8 may be executed concurrently or with partial concurrence. Further, in some embodiments, one or more of the blocks shown in FIGS. 6 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 123, and specifically the promotional communication application 126, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable storage medium, storing program instructions that when executed on a computing device create an electronic commerce system comprising a promotional communication component configured to:
   receive, from a user computing device associated with a user, a request for a network page corresponding to an electronic commerce transaction associated with the user, wherein the user has been previously authenticated by the electronic commerce system;
   responsive to the request for the network page, determine an option status of the user, the option status indicating that the user has opted out of receiving promotional emails;
   analyze a purchase history within a data store, the purchase history comprising a log of products previously purchased by the user with the electronic commerce system to determine that the user meets a criterion to be prompted to opt back into receiving the promotional emails, wherein the criterion specifies a predefined number of purchases made by the user through the electronic commerce system using the user computing device during a period of time subsequent to the user opting out of receiving promotional emails;

analyze a browse history within the data store to identify a current network page requested by the user, the browse history comprising a log of requested network pages resulting from an interaction of the user with the electronic commerce system;

generate a version of the current network page that includes a prompt configured to opt the user back into receiving promotional emails when the prompt is manipulated by the user on a client device;

cause the generated version of the network page to be transmitted to a computing device of the user;

receive a notification from the client device that the user has manipulated the prompt;

cause a promotional email to be sent to the user in response to receipt of the notification;

receive, from an internet service provider, an indication that the promotional email was designated as an unwanted communication by the user; and modify a schedule for sending future promotional emails to match a frequency specified in a table that plots a frequency at which a communication is to be sent relative to a frequency of rejections received from the internet service provider.

2. The non-transitory computer-readable storage medium of claim 1, further comprising program instructions that when executed on the computing device, cause the promotional communication component to be further configured to:

responsive to receipt of a notice from the user indicating that the user has manipulated the prompt to opt back into receiving promotional emails, analyze a table to determine a frequency for sending future promotional emails, wherein the table plots a frequency at which a communication is to be sent to a customer relative to a frequency of rejections received from the internet service provider; and send promotional emails to the user at a rate less frequent than the determined frequency.

3. The non-transitory computer-readable storage medium of claim 1, wherein the generated version of the current network page further comprises:

a first interface element requesting a specified frequency to receive promotional emails; and a second interface element comprising a list of limitations on the promotional emails to individual categories.

4. The non-transitory computer-readable storage medium of claim 1, wherein the prompt comprises a pop-up component of the version of the current network page that includes the prompt.

5. The non-transitory computer-readable storage medium of claim 1, wherein the prompt comprises a message with an associated graphical component rendered as a portion of the version of the current network page that includes the prompt.

6. The non-transitory computer-readable storage medium of claim 1, wherein the prompt comprises a selection network content item to facilitate a selection of at least one option to control a delivery of the future promotional communications.

7. The non-transitory computer-readable storage medium of claim 1, wherein the prompt comprises a selection network content item that comprises an option to select at least one category of items, wherein the promotional email comprises subject matter related to the at least one category of items.

8. The non-transitory computer-readable storage medium of claim 1, wherein the prompt comprises a sample of the promotional email.

9. A system, comprising:

at least one computing device hosting an electronic commerce system; and an application executable in the at least one computing device, wherein the application is a component of the electronic commerce system and the application comprises machine readable instructions that, when executed by the at least one computing device, cause the at least one computing device to at least:

determine an option status of a user, wherein the option status indicates that the user has declined to receive a promotional communication from an entity;

retrieve a purchase history associated with the user from a data store to determine whether the user meets a criterion to be prompted to opt back into receiving a plurality of future promotional communications from the entity, wherein:

the purchase history comprises a log of items previously purchased by the user through the electronic commerce system, and the criterion specifies a predefined number of purchases made by the user through an electronic commerce system during a preceding period of time;

generate a prompt configured to change the option status of the user if manipulated by the user at a client;

include the prompt within a network content item;

send the network content item to a client associated with the user; and analyze a browse history within a data store to identify a category of promotional emails to send to the user in response to a change in the option status of the user, wherein the browse history comprises a log of requested network pages resulting from an interaction of the user with the application.

10. The system of claim 9, wherein the prompt comprises a message with an associated graphical component to be rendered as a portion of the network content item, wherein the associated graphical component is configured to initiate a re-selection of the option status of the user.

11. The system of claim 9, wherein the prompt comprises a pop-up associated with the network content item, the pop-up including a graphical component configured to initiate a re-selection of the option status of the user.

12. The system of claim 9, wherein a re-selection of the option status further comprises generating a selection network content item to facilitate a selection of at least one option to control a delivery of the future promotional communications to the user.

13. The system of claim 12, wherein the at least one option includes a selection of a frequency at which the future promotional communications are to be generated and sent to the user.

14. The system of claim 12, wherein the at least one option includes a selection of at least one sample promotional communication to be sent to the user.

15. The system of claim 12, wherein the at least one option includes a selection of a moratorium over sending of the future promotional communications to the user.

16. The system of claim 12, wherein the at least one option includes a selection of at least one category of items, where the future promotional communications are restricted to subject matter related to the at least one category of items.

17. The system of claim 9, wherein:
the application further comprises machine readable instructions that, when executed by the at least one computing device, cause the at least one computing device to at least identify whether a promotion in the electronic commerce system is directed to an item to be presented to the user in the network content item; and
the prompt relates to the item.

18. The system of claim 9, wherein:
the application further comprises machine readable instructions that, when executed by the at least one computing device, cause the at least one computing device to at least identify whether a promotion in the electronic commerce system is directed to an item to be presented to the user in the network content item; and
the prompt relates to a category that includes the item.

19. A system, comprising:
at least one computing device hosting an electronic commerce application; and
an application executable in the at least one computing device, the application comprising machine readable instructions that, when executed by the at least one computing device, cause the at least one computing device to at least:
determine an option status of a user in response to receipt of a request for a network page from a device linked to the user, wherein the option status indicates whether the user wishes to receive a communication from an entity;
analyze a purchase history stored in a data store to determine whether the user meets a criterion to be prompted to opt back into receiving a plurality of future communications from the entity,
wherein the criterion specifies a predefined number of purchases made by the user through an electronic commerce system during a preceding period of time, and
wherein the purchase history comprises a history of purchases made by the user through the electronic commerce system hosted by the at least one computing device;
identify a current browse session of a client associated with the user;
associate a prompt with a network content item corresponding to the requested network page, wherein the prompt is configured to change the option status of the user if manipulated by the user at the client; and
send the requested network page to the client.

20. The system of claim 19, wherein the prompt comprises a pop-up associated with the network content item, the pop-up including a graphical component configured to initiate a re-selection of the option status of the user.

21. The system of claim 19, wherein a re-selection of the option status further comprises generating a selection network content item to facilitate a selection of at least one option to control a delivery of the future communications to the user.

22. The system of claim 20, wherein the prompt comprises a sample of the future communications.

23. The system of claim 20, wherein the prompt comprises a selector to facilitate a selection of at least one option to control delivery of the future communications.

* * * * *